July 25, 1967   S. KOWALSKI   3,332,709
UNION WITH PROVISION FOR MISALIGNMENT
Filed Dec. 14, 1965   2 Sheets-Sheet 1
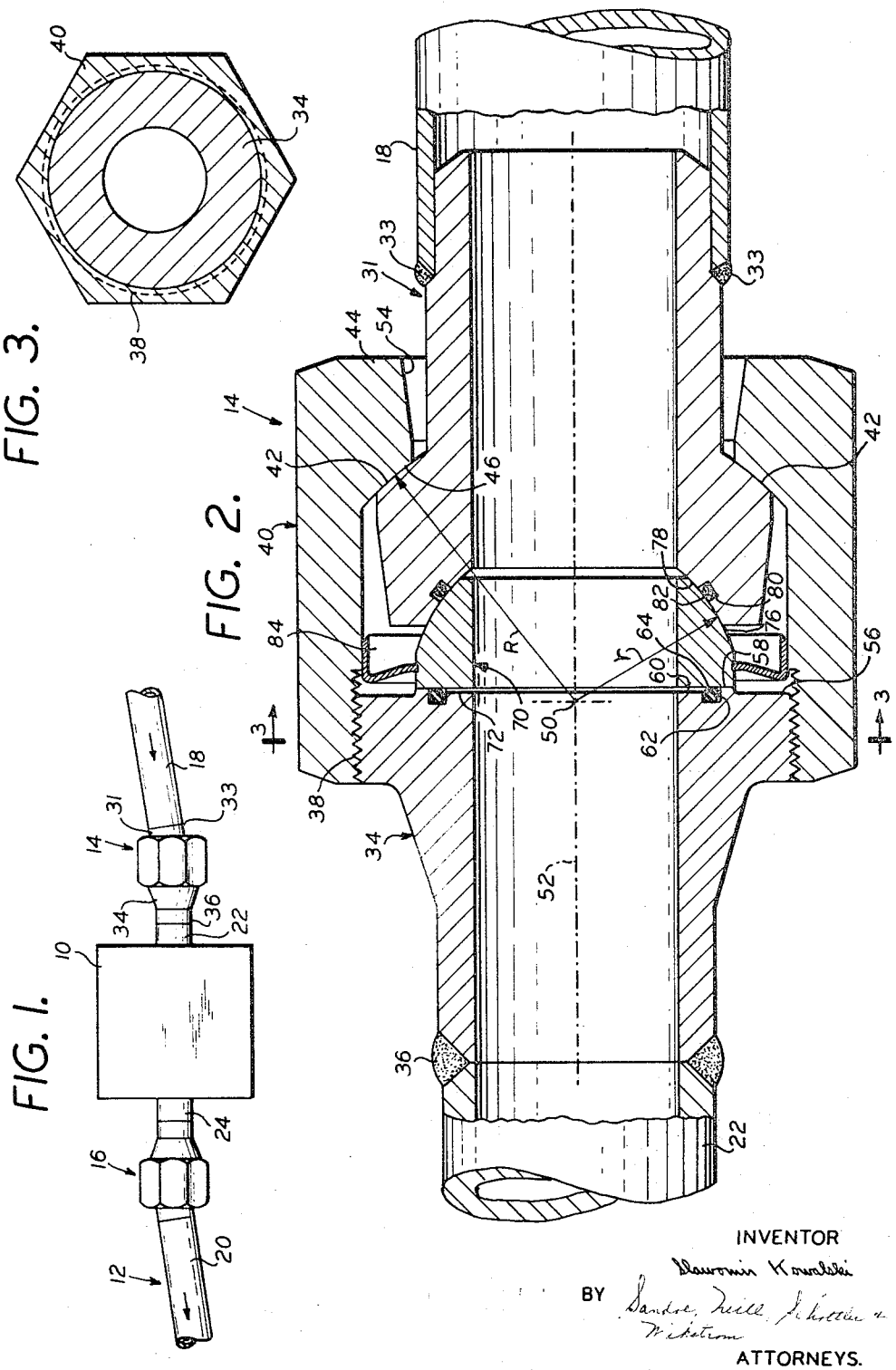
INVENTOR
Slawomir Kowalski
BY Sandoe, Hill, Schettler & Nikstrom
ATTORNEYS.

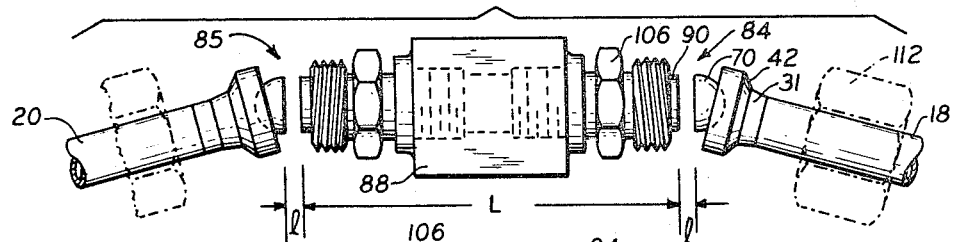
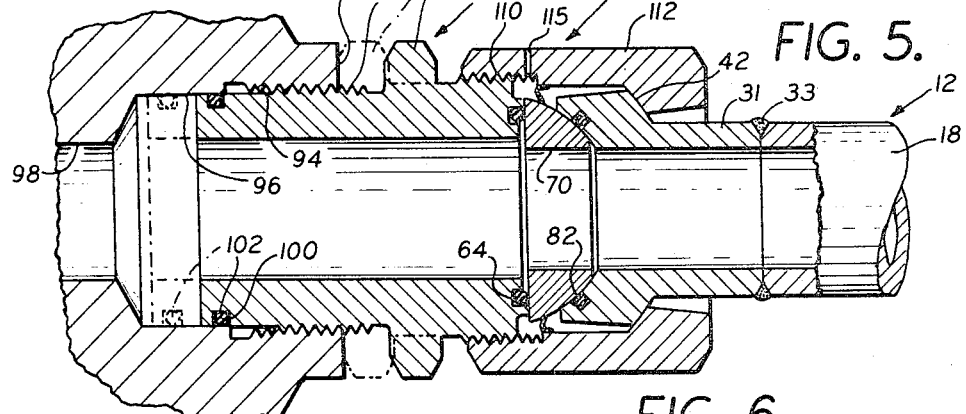
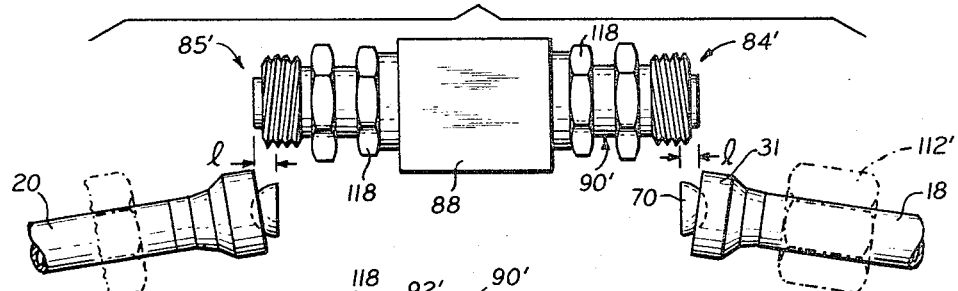
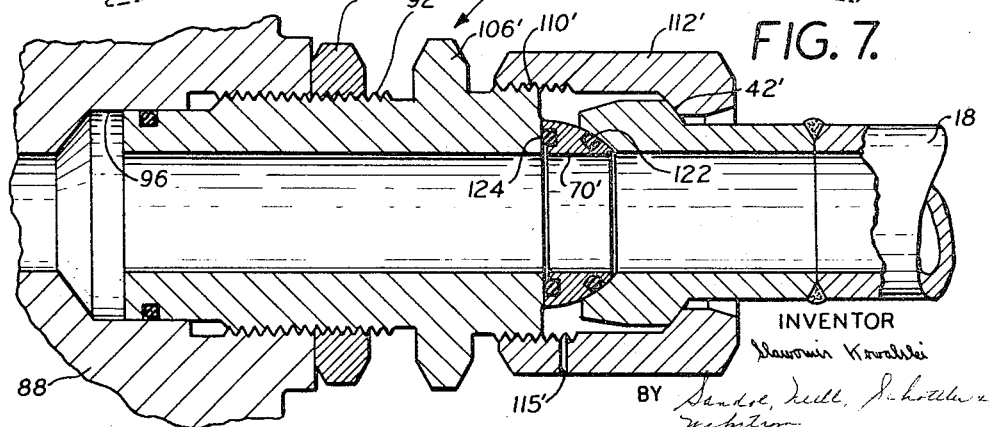

United States Patent Office 3,332,709
Patented July 25, 1967

3,332,709
UNION WITH PROVISION FOR MISALIGNMENT
Slawomir Kowalski, Rockaway, N.J., assignor to Marotta Valve Corporation, Boonton, N.J., a corporation of New Jersey
Filed Dec. 14, 1965, Ser. No. 513,710
5 Claims. (Cl. 285—23)

This application is a continuation in part of my copending application Ser. No. 271,946, filed Apr. 10, 1963, now abandoned.

This invention relates to unions for connecting pipes, the term "pipe" being used in a broad sense to include tubes and conduits generally.

It is an object of the invention to provide a pipe union with provisions for misalignment of the pipes that it connects and with a construction that permits the connection at the union to be opened without any substantial axial movement of the pipe. Ordinary unions that have complementary spherical zone surfaces providing for misalignment have been open to the objection that the surfaces can not be separated transversely from one another without first moving one of the surfaces axially with respect to the other for a distance sufficient to let the convex surface move from the concave surface far enough to swing clear of it as one pipe is moved transversely with respect to the other to open the union.

Another object is to provide an improved union which can be installed and subsequently opened in a pipe system where the pipes connected by the union are capable of little or no axial movement.

Another object of the invention is to provide a union having a fitting that can be adjusted to compensate variations in the lengths of the components of the fitting or of the pipeline sections and sub-assemblies with which the union is to be used. Such variations are sometimes the result of manufacturing tolerances.

Still another object is to provide a fitting, of the character indicated, with a clamping nut and with a sealing element that is held centered in the clamping nut to facilitate assembly of the union and to prevent the sealing element from dropping out accidentally during disassembly of the union.

Other objects, features and advantages of the invention will appear or be pointed out as the description proceeds.

In the drawing, forming a part hereof, in which like reference characters indicate corresponding parts in all the views:

FIGURE 1 is a diagrammatic assembly view showing a unit connected in a pipe line by unions made in accordance with this invention;

FIGURE 2 is a sectional view through one of the unions of FIGURE 1, but with the parts shown in their positions of axial alignment;

FIGURE 3 is a reduced-scale, sectional view taken on the line 3—3 of FIGURE 2;

FIGURE 4 is a diagrammatic view showing a modified form of the invention and in which the union is shorter than the space into which it is to be inserted in a pipeline;

FIGURE 5 is a sectional view of one of the unions illustrated in FIGURE 4, but with the union in assembled condition;

FIGURE 6 is a view similar to FIGURE 5 but illustrating a condition in which the union is longer than the space into which it is to be inserted in a pipeline; and FIGURE 7 is a view similar to FIGURE 5 but showing another modification of the invention.

FIGURE 1 shows an equipment unit 10 connected in a pipeline 12 by two pipe unions 14 and 16. The pipeline 12 includes two pipes 18 and 20 which were originally located in different planes and which were incapable of axial movement.

The unit 10 has a boss or pipe 22 through which an inlet passage opens into the unit; and also has a boss or pipe 24 through which an outlet opening extends. Whether the bosses or pipes 22 and 24 are integral portions of a housing casting, with or without threads, or whether they are nipples screwed into openings in the housing of the unit 10, they are functionally pipes of the pipe line 12.

In order to connect the equipment unit 10 with the pipes 18 and 20, these pipes are forced out of the planes in which they were originally located and they are brought into position to be connected by the unions 14 and 16 to the unit 10. Both of the unions 14 and 16 take up a portion of the misalignment caused by the insertion of the unit 10, in the pipe line 12, with the equipment unit positioned so that its inlet and outlet pipes 22 and 24, respectively, are in a horizontal position, or some other position, which is required and which is not in alignment with either of the pipes 18 and 20.

FIGURE 2 shows the construction of the union 14. It includes a fitting 31 secured to the pipe 18 by welding 33 or in any other suitable manner.

There is another fitting 34, on the other side of the union 14, connected with the pipe 22 by welding 36. There are threads 38 on the fitting 34, and these threads engage threads on a nut 40 which moves axially of the union in one direction or the other, depending upon which way the nut is turned on the threads 38.

The fitting 31 has a shoulder 42; and the nut 40 has an inwardly-extending flange 44 which includes an abutment surface 46 that overlaps the shoulder 42.

The shoulder 42 has a convex spherical zone surface with a radius R, as indicated by the arrow in FIGURE 2. The center of curvature of this spherical zone surface is at a point 50 which is located on the longitudinal axis of the fitting; this axis being designated by the reference character 52.

The abutment surface 46 on the flange 44 of the nut 40 is a concave spherical zone surface with a radius R and with its center of curvature at the point 50. Thus, the confronting surfaces of the fitting 31 and the flange 44 are complementary and permit relative movement of the nut 40 and fitting 31 about the point 50 without interfering with the surface contact of the confronting faces.

The outside diameter of the fitting 31 is less than the inside diameter of the nut 40 ahead of the flange 44; and the nut 40 has an opening 54 of substantially larger diameter than the outside diameter of the portion of the fitting 31 that passes through this opening 54. Thus the fitting 31 and nut 40 can have a substantial angle of misalignment with one another without having any portion of the fitting 31 touch the nut 40 elsewhere than on the abutment surface 46.

The fitting 34 has an end face with an outer annular surface 56 which need not be machined, and an intermediate annular surface 58 and an inner annular surface 60. The intermediate surface 58 is preferably machined and is positioned slightly ahead of the other annular surfaces 56 and 60. A circumferentially-extending groove 62 in the end face of the fitting 34, between the intermediate surface 58 and the inner surface 60, holds a sealing ring 64, preferably an O-ring having a diameter slightly greater than the depth of the groove 62 on the side adjacent to the intermediate annular surface 58.

A sealing element 70 is located between the end faces of the fittings 31 and 34. This sealing element 70 has a face 72 confronting the end face of the fitting 34. In the preferred construction, the end face 72 is preferably a plane surface which contacts with the intermediate annular surface 58 of the fitting 34. There is some clearance between the end face 72 and the inner annular surface 60, in the preferred consrtuction.

The sealing element 70 has a convex end face 76 on its end which confronts the fitting 31. This convex end face 76 is a spherical zone surface having a radius $r$, as indicated by the arrow in FIGURE 2; and the center of curvature of the face 76 is at the point 50. The fitting 31 has an end face 78 complementary to the end face 76 and comprising a concave spherical zone surface of radius $r$ and with its center of curvature at the point 50.

The fitting 31 and the sealing element 70 are made with no obstructions beyond their complementary end faces 76 and 78 so that there can be a substantial angle of misalignment between the longitudinal axes of the fitting 31 and sealing element 70 without having any part of the fitting 31 contact with the sealing element 70 elsewhere than on the convex end face 76.

There is a circumferentially-extending groove 80 in the face 78 and there is an O-ring 82, or other sealing means, in the groove 80.

A holder 83 surrounds the sealing element 70 and fits within the interior diameter of the nut 40 just beyond the threads 38. During assembly of the fitting, the threads 38 of the nut 40 first slide over the holder 83 and then the smooth-bore portion of the nut 40 beyond the threads 38 slides over the holder 83. The diameter of the nut 40 inside the threads is substantially equal to the smooth-bore of the nut beyond the threads. The cylindrical portion of the holder 83 has a tapered forward edge 85 to facilitate passage over the threads 38 and over the shoulder at the end of the threads. The holder 83 preferably made of spring material and is capable of yielding as necessary during assembly.

This holder 83 serves to keep the sealing element 70 centered in the nut during assembly of the union. The holder 83 is resilient and may be formed with spokes so as to yield when necessary so as not to have manufacturing tolerances of the holder 83 interfere with the correct engagement of the spherical zone surfaces of the fitting 31, nut 40 and sealing element 70. The holder 83 is also useful for preventing the element 70 from dropping out when the assembly is disconnected. The construction being novel, the person disconnecting the fitting usually does not know that it contains the separate sealing element 70. If it drops out it may roll into an inaccessible place and be lost.

From the above description it will be apparent that the fitting 31 can move on the confronting concentric surfaces 46 and 76 to accommodate a substantial angle of misalignment of the fitting 31 with the rest of the union, and without affecting any of the other parts of the union, or the positions of the nut 40 when the union is clamped tight.

Because of the plane surfaces at which the fitting 34 confronts the sealing element 70, the union can be opened by backing off the nut 40 and then shifting either the fitting 31 or the fitting 34 transversely with respect to the other fitting. No axial movement of the fittings 31 and 34, and resulting axial movement of the pipes 22 and 18, is necessary.

The fact that the union can be opened without axial movement of the fittings makes it possible also to insert the union in a pipeline where the pipes or other parts to be connected are not capable of axial movement.

FIGURE 4 shows the pipes 18 and 20 connected with unions which are similar to but slight modifications of the construction illustrated in FIGURE 2. There are two of these modified pipe unions designated generally by the reference characters 84 and 85. The unions are open in FIGURE 4 and the space between the pipes 18 and 20 is somewhat greater than the length of the unions 84 and 85 and a component 88 to which these unions 84 and 85 are connected. Although the ends of the pipes 18 and 20 would move closer together if they could be brought more nearly into alignment, the condition illustrated in FIGURE 4 is one in which there is excess space between the ends of the pipes for receiving the unions 84 and 85 and the component 88.

In order to provide for situations such as illustrated in FIGURE 4, the unions 84 and 85, or at least one of them, is connected to the component 88 by a fitting 90 which is adjustable axially with respect to the component 88, to compensate for the excess of space between the ends of the pipes 18 and 20. This fitting 90 has threads 92 which screw into complementary threads 94 in a cylindrical counterbore 96 at one end of a passage 98 that extends lengthwise through the component 88. While the component 88 may be a valve or regulator or any one of various other constructions that are used in pipe lines, it is merely shown as a housing in the drawing, in order to simplify the illustration. Insofar as the present invention is concerned, it makes no difference what kind of apparatus the component 88 may be, so long as it has the cylindrical counterbore 96 and the threads 94 for receiving the first fitting 90 of the pipe union 84.

There is a cylindrical groove 100 in the cylindrical surface of the fitting 90 beyond the threads 92; and there is a seal comprising an O-ring 102 in the groove 100 for preventing leakage of fluid between the wall of the counterbore 96 and the confronting cylindrical face of the fitting 90.

The amount of axial adjustment which can be obtained from the fitting 90 is evident by comparing the full-line position shown in FIGURE 5 with the broken-line position shown in the same figure. The full-line position shows the fitting 90 moved as far as possible to the right to increase the length of the combined component 88 and fitting 90. Any further movement of the fitting 90 toward the right would move the O-ring 102 beyond the cylindrical surface of the counterbore 96 and would make the seal ineffective. The broken-line position of the fitting 90 represents its extreme movement toward the left in FIGURE 5. This movement is limited by the hexagonal flange 106 which strikes against an end face 108 of the component 88 when the fitting 90 is screwed into the threads 94.

At the other end of the first fitting 90, there are other threads 110 for receiving a clamping nut 112 which corresponds to the nut 44 of FIGURE 2. The second fitting of the union 84 is the same as in FIGURE 2 and is designated by the same reference character 31. Other parts of the union 84 which are identical with the construction shown in FIGURE 2 are designated by the same reference characters as in FIGURE 2.

The nut 112 has a transverse opening 115 at a location adjacent to the face of the seal 70 which confronts the end face of the fitting 90. This opening 115 is small enough so as not to impair the strength of the nut, but is large enough to permit inspection of the seal 70 so as to determine its condition where it confronts the end face of the fitting 90 and to determine by inspection the tightness of the union.

FIGURE 6 shows another modified form of the unions 84 and 85 and these corresponding unions in FIGURE 6 are indicated by the reference characters 84' and 85'. The only difference between the constructions is in the length of the first fitting, indicated by the reference character 90'. Parts of the fitting 90', which are identical or correspond to parts of the fitting 90, are indicated by the same reference characters with a prime appended. The fitting 90' is longer than the fitting 90 and it has threads 92' which are longer than the threads 92. There is a lock nut 118 on the threads 92 and this lock nut can be used for holding the fitting 90' in any adjusted position with respect to the component 88 into which the fitting 90' screws in a manner which has already been described in connection with FIGURE 5.

FIGURE 6 shows the pipes 18 and 20 with the space between the ends of these pipes less than the combined lengths of the component 88 and the fittings of the unions 84' and 85' which are connected to the component 88. In order to connect the pipes 18 and 20, by means of the unions 84' and 85', the fitting 90' and the corresponding fitting on the other side of the component 88, are screwed further into the component 88 after backing off the lock nuts 118 as much as necessary to permit the required adjustment. The hexagonal flange 106' is used for receiving a tool by which the fitting 90' is rotated one way or the other to adjust it with respect to the component 88.

Another difference in construction in the union 84' is in the seal 70'. In places of the O-rings 82 and 64 located in end faces of the fittings 31 and 90, there are O-rings 122 and 124 located in grooves in the faces of the seal 70'. This is a mere reversal in the locations of the grooves into which the O-rings are placed, and similar reversals can be made in the constructions of FIGURES 2 and 5 without affecting the operation of the invention.

The preferred embodiment of the invention has been illustrated and described but various changes and modifications can be made and some features can be used in different combinations without departing from the invention as defined in the claims.

What is claimed is:

1. A union for connecting misaligned pipes, said union comprising separate pipe fittings for the respective pipes, means for connecting the first fitting to one pipe, a concave spherical zone end face on the second fitting, means for connecting the second fitting to another pipe, other means for connecting the fittings to one another including threads on the circumference of the first fitting, and a nut that screws over said threads, a shoulder on the second fitting having a convex spherical zone surface, a flange on the nut overlapping the shoulder and having a concave spherical zone surface for contact with the shoulder of the nut, a sealing element tightly clamped between the end faces of the fittings, said sealing element having a first face confronting the end face of the first fitting and a convex spherical zone surface confronting the end face of the second fitting, and a holder for holding the sealing element located in the nut and substantially centered in the union during assembly and dis-assembly of the union, the holder engaging the sealing element and an inside surface of the nut and being movable axially along said inside surface during assembly and dis-assembly of the union.

2. The union described in claim 1 characterized by the holder being made of spring material and extending between the sealing element and the inside surface of the nut and being movable axially along the threads of the nut and then along an inside surface of the nut beyond the threads, said inside surface of the nut having substantially the same diameter as the inside diameter of the threads.

3. The union described in claim 1 characterized by one of the confronting spherical zone surfaces of the fitting and sealing element having a circumferentially-extending groove with a sealing ring therein, and one of the confronting faces of the sealing element and the other fitting also having a circumferentially-extending groove with a sealing ring therein.

4. The union described in claim 1 characterized by the end face of the fitting that disengages transversely from the complementary face of the sealing element being a substantially plane surface.

5. The union described in claim 4 characterized by the plane surface being substantially normal to the longitudinal axis of the fitting on which said plane surface is located.

References Cited

UNITED STATES PATENTS

| | | | |
|---|---|---|---|
| 731,031 | 6/1903 | Flory | 285—271 |
| 1,615,536 | 1/1927 | DelMar | 285—32 |
| 1,617,587 | 2/1927 | Frumveller | 285—267 X |
| 1,639,800 | 8/1927 | Gillick | 285—166 |
| 1,652,064 | 12/1927 | Sweney | 285—263 |
| 2,025,113 | 12/1935 | Laurent | 285—261 |
| 2,628,112 | 2/1953 | Hebard | 285—264 X |
| 2,967,068 | 1/1961 | Gressel | 285—14 X |

FOREIGN PATENTS

| | | |
|---|---|---|
| 991,025 | 6/1951 | France. |
| 998,646 | 9/1951 | France. |
| 1,039,798 | 9/1958 | Germany. |
| 221,263 | 9/1924 | Great Britain. |

CARL W. TOMLIN, *Primary Examiner.*

D. W. AROLA, *Assistant Examiner.*